(12) United States Patent
Gaus et al.

(10) Patent No.: US 12,735,232 B2
(45) Date of Patent: Sep. 15, 2026

(54) DISPENSING VALVE

(71) Applicant: AptarGroup, Inc., Crystal Lake, IL (US)

(72) Inventors: David J. Gaus, Midland, MI (US); Gregory M. Olechowski, Kawkawlin, MI (US)

(73) Assignee: AptarGroup, Inc., Crystal Lake, IL (US)

( * ) Notice: Subject to any disclaimer, the term of this patent is extended or adjusted under 35 U.S.C. 154(b) by 86 days.

(21) Appl. No.: 18/857,371

(22) PCT Filed: Apr. 28, 2022

(86) PCT No.: PCT/US2022/026725
§ 371 (c)(1),
(2) Date: Oct. 16, 2024

(87) PCT Pub. No.: WO2023/211448
PCT Pub. Date: Nov. 2, 2023

(65) Prior Publication Data

US 2025/0263210 A1 Aug. 21, 2025

(51) Int. Cl.
*B65D 47/20* (2006.01)
*B65D 47/08* (2006.01)
*F16K 15/14* (2006.01)

(52) U.S. Cl.
CPC ....... *B65D 47/2031* (2013.01); *B65D 47/088* (2013.01); *F16K 15/1471* (2021.08)

(58) Field of Classification Search
CPC .............. B65D 47/2031; B65D 47/088; B65D 2251/1041; B65D 47/0804;
(Continued)

(56) References Cited

U.S. PATENT DOCUMENTS 5,839,614 A 11/1998 Brown
6,112,951 A * 9/2000 Mueller ................ B29D 23/20 222/490
(Continued)

FOREIGN PATENT DOCUMENTS

DE 202014011235 U1 9/2018
JP H07132979 A 5/1995
(Continued)

OTHER PUBLICATIONS

International Search Report and Written Opinion dated Jul. 27, 2022 for PCT/US2022/026725 of which this is the U.S. national phase application.

*Primary Examiner* — Christopher R Demeree
(74) *Attorney, Agent, or Firm* — Wood, Phillips, Katz, Clark & Mortimer

(57) ABSTRACT

A TPE valve (20, 20A) includes a head (125, 125A) with a central axis (43) and has an interior surface (130, 130A, 132, 132A, 133, 133A), an exterior surface (134, 134A), and at least one self-sealing slit (140, 140A). The valve (20, 20A) includes a peripheral attachment portion (120, 120A) spaced laterally from the head (125, 125A) and an intermediate portion (124, 124A) extending laterally from the head (125, 125A) to the peripheral attachment portion (120, 120A). The intermediate portion (124, 124A) has an interior surface (126, 126A) and an exterior surface (127, 127A). The interior surface (130, 130A, 132, 132A, 133, 133A) of the head (125, 125A) and the interior surface (126, 126A) of the intermediate portion (124, 124A) intersect at a first circular line of intersection (150, 150A). The exterior surface (134, 134A) of the head (125, 125A) and the exterior surface (127, 127A) of the intermediate portion (124, 124A) intersect at a second circular line of intersection (154, 154A). The first circular line of intersection (150, 150A) and the second
(Continued)

circular line of intersection (150, 150A) are spaced an axial distance no greater than about 0.30 millimeter.

16 Claims, 6 Drawing Sheets

(58) Field of Classification Search
CPC ............ B65D 2565/385; B65D 47/043; B65D 83/771; F16K 15/1471; F16K 15/147
USPC ............... 222/544, 494, 490, 213, 493, 496; 137/849, 614.2; 220/203.18, 89.1
See application file for complete search history.

(56) References Cited

U.S. PATENT DOCUMENTS

| | | | | |
|---|---|---|---|---|
| 6,112,952 | A * | 9/2000 | Hess, III | B65D 47/2062 137/849 |
| 6,269,986 | B1 | 8/2001 | Gross | |
| 6,293,437 | B1 * | 9/2001 | Socier | B65D 47/2031 222/212 |
| 6,951,295 | B1 * | 10/2005 | Gaus | B05B 11/00442 222/484 |
| 2007/0114250 | A1 * | 5/2007 | Langseder | B65D 47/2031 222/494 |
| 2009/0212078 | A1 | 8/2009 | Gaus | |
| 2014/0209644 | A1 | 7/2014 | Socier et al. | |
| 2019/0358667 | A1 | 11/2019 | Gaus et al. | |
| 2021/0309421 | A1 | 10/2021 | Hiltser et al. | |

FOREIGN PATENT DOCUMENTS

| | | |
|---|---|---|
| JP | 2005-511440 A | 2/2005 |
| JP | 2016-515985 A | 6/2016 |

* cited by examiner

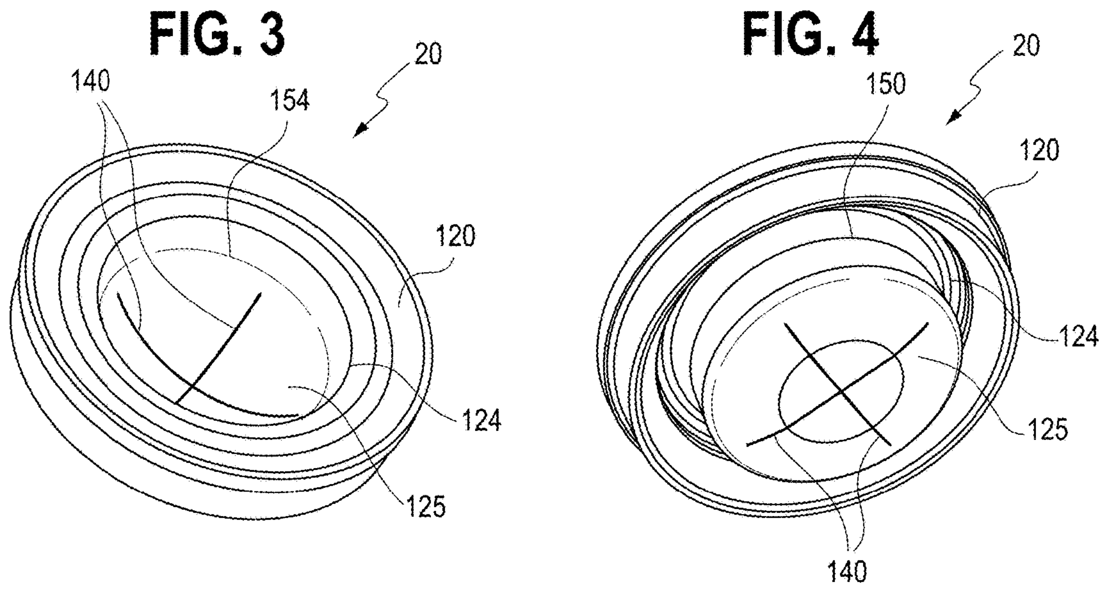
FIG. 3
20
140
154
120
124
125
FIG. 4
20
150
120
124
125
140
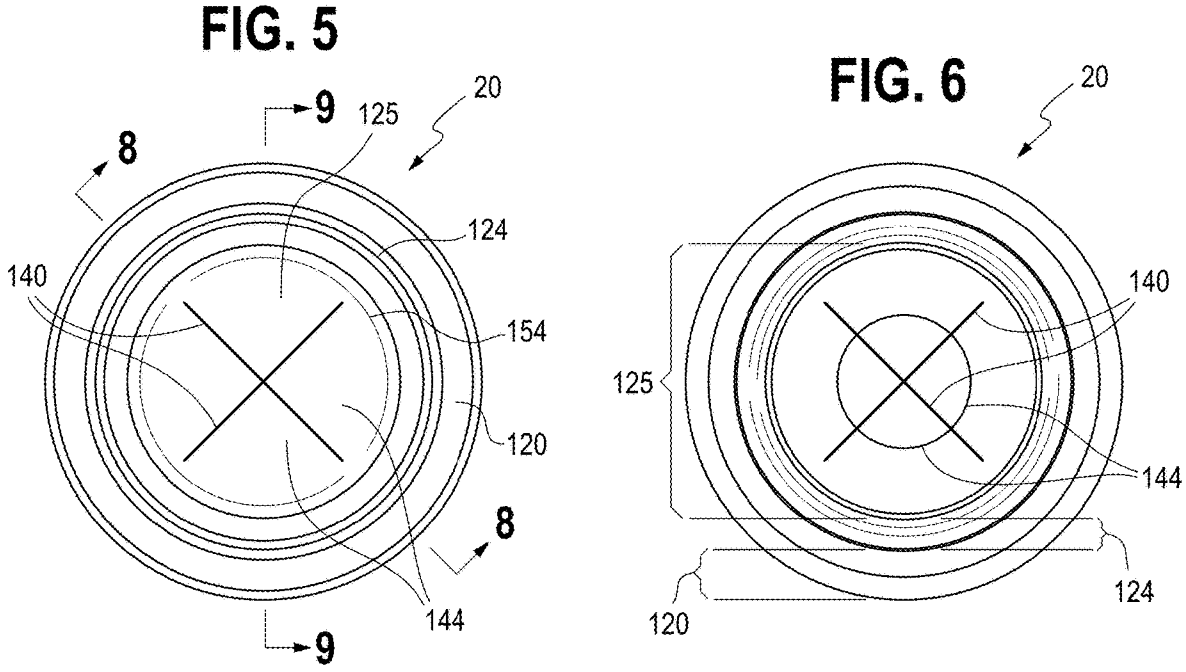
FIG. 5
20
9
125
8
124
140
154
120
8
144
9
FIG. 6
20
140
125
144
124
120

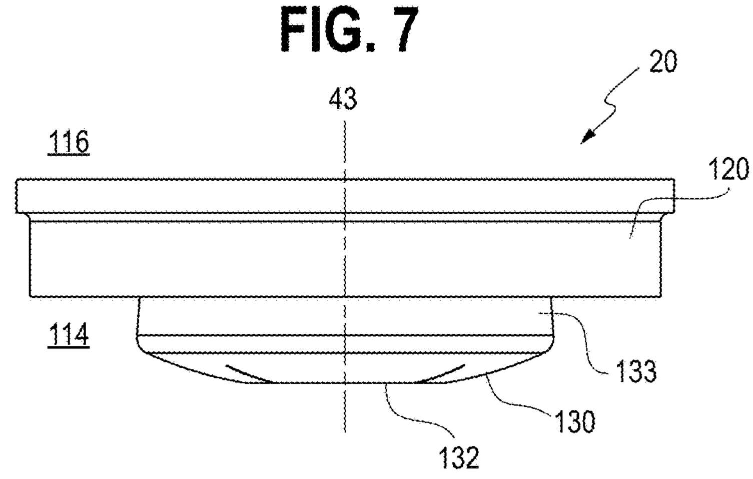
FIG. 7
20
43
116
120
114
133
130
132
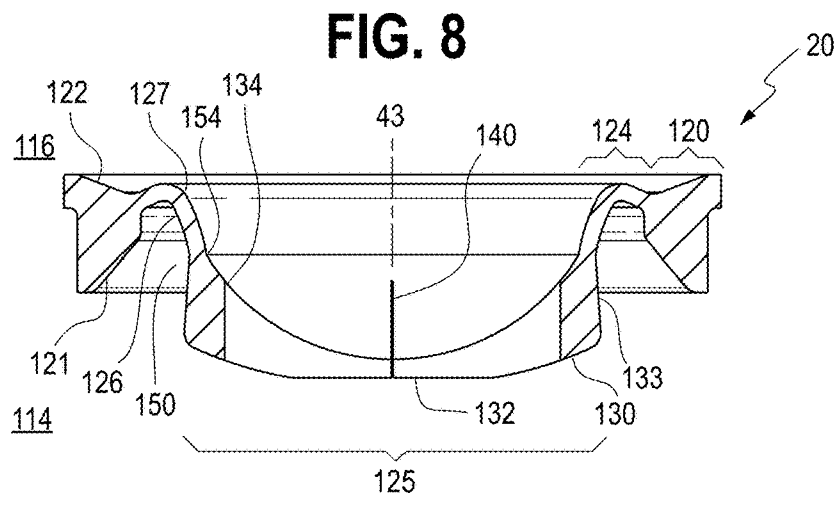
FIG. 8
20
122
127
134
154
43
140
124
120
116
121
126
150
114
133
132
130
125
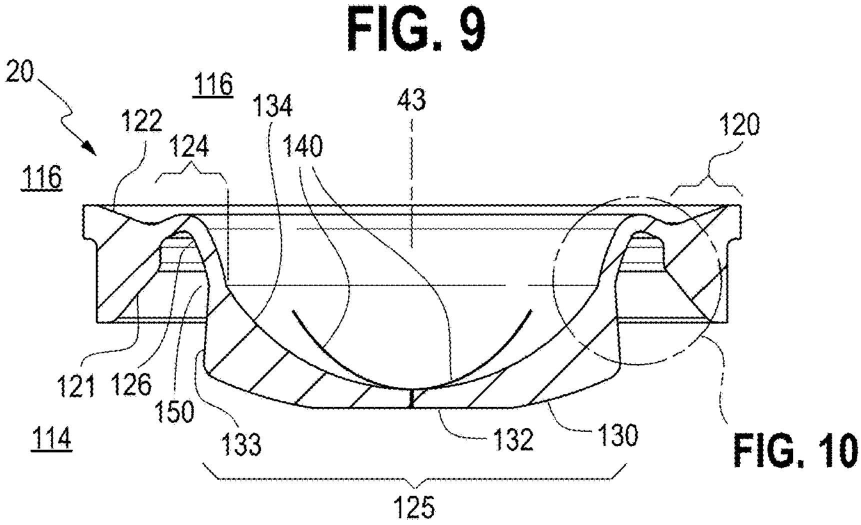
FIG. 9
20
116
134
43
122
124
140
120
116
121
126
150
114
133
132
130
FIG. 10
125

DISPENSING VALVE

TECHNICAL FIELD

The present invention relates generally to dispensing valves and systems, and more particularly relates to valves for dispensing a product from a container or other source, and in more particular applications, to such valves suitable for use in a dispensing closure for a flexible container which is squeezable to create a pressure differential across the valve.

BACKGROUND OF THE INVENTION AND TECHNICAL PROBLEMS POSED BY THE PRIOR ART

One type of valve is a flexible, resilient, self-closing, slit-type valve that can be mounted at an opening or port of a package or container of a fluent substance, or alternatively mounted within a conduit for a fluent substance. Such valves typically have a single slit or have multiple slits which define a normally closed orifice in an initially closed configuration or condition. The orifice opens to permit flow therethrough in response to either a sufficient pressure differential acting across opposite sides of the valve, or in response to mechanical engagement by a sufficiently rigid article such as a probe, cannula, conduit, or feed/drain tool inserted through the valve. Such valves that open in response to a pressure differential are typically designed so that they automatically close to seal or shut off flow therethrough in response to a sufficient reduction of the pressure differential acting across the valve. Similarly, mechanically engageable valves are typically designed so that they automatically close to seal or shut off flow therethrough upon removal of the engaging article.

Designs of such valves and of closures using such valves are illustrated in U.S. Pat. Nos. 5,839,614 and 8,678,249. The descriptions of those patents are incorporated herein by reference thereto to the extent pertinent and to the extent not inconsistent herewith. Typically, the closure includes a body or base mounted on the container neck to define a seat for receiving the valve and includes a retaining ring or other structure for holding the valve on the seat in the base. See, for example, U.S. Pat. No. 6,269,986. The valve is normally closed and can withstand the weight of the fluent product when the container is completely inverted so that the liquid will not leak out unless the container is squeezed. With such a system, the lid or cap need not be re-closed (although it is typically re-closed if the package is to be transported to another location, packed in a suitcase, etc.).

Conventional valves are suitable for use with fluent substances, such as liquids and gases, including, inter alia, beverages, lotions, and creams. Conventional valves are preferably molded as a unitary structure (i.e., one-piece structure) from a single substance or material which is flexible, pliable, somewhat elastic, and resilient. This typically includes a silicone rubber, such as the silicone rubber sold by Dow Corning Corporation in the United States of America under the trade designation D.C. 99-595 and RBL-9595-40. Another suitable silicone rubber material is sold in the United States of America under the designation Wacker 3003-40 by Wacker Silicone Company.

Typically, such conventional valves are not formed from the same type of plastic as the accompanying closure and/or container, which may present difficulty in during recycling. For example, the conventional valve may need to be disassembled from the retaining ring, closure, and/or container prior to, or during, the recycling process.

The inventors of the present invention have discovered that, at least in some applications, a valve formed form a thermoplastic elastomer (TPE) may advantageously be recycled more readily than a conventional silicone valve, but may suffer from undesirable performance (e.g., insufficient closing force, etc.) compared to conventional valves prior to, during, or after, dispensing a fluent substance through the TPE valve.

The inventors of the present invention have determined that for at least some applications in which some types of fluent substances are contained within a package or container, it may be desirable to provide a TPE valve that can suitably perform the functions of a conventional valve.

The inventors of the present invention have also determined that it would be desirable to provide, at least for one or more types of applications, an improved TPE valve that can be configured for use with a fluent substance container so as to have one or more of the following advantages: (1) ease of manufacture and/or assembly, (2) relatively low cost of manufacture and/or assembly, (3) improved ease of recyclability, and (4) accommodation of the manufacture of the valve by means of efficient, high-quality, large-volume techniques with a reduced product reject rate to produce valves with consistent operating characteristics.

The inventors of the present invention have discovered how to provide such a valve that includes novel, advantageous features not heretofore taught or contemplated by the prior art, and which can accommodate designs having one or more of the above-discussed benefits or features.

BRIEF SUMMARY OF THE INVENTION

The inventors of the present invention have discovered how to provide an improved valve formed from a TPE material or materials having improved performance and recycling compared to conventional valves made of TPE or other materials. The inventive valve may be assembled with, or provided within, a package or container of a fluent substance, or a fluid handling system (such as a fluent substance dispensing system), that has an opening between the exterior and interior of the container or system at which the valve can be installed. The valve may also be used within a fluent substance container or system that utilizes a probe, cannula, conduit (e.g., feed/drain tool), or another engaging article that is mechanically inserted through the valve.

According to one broad aspect of the present invention, the inventive valve is a flexible, resilient slit valve for permitting selective dispensing of a fluent product from an interior environment to an exterior environment. The valve includes a flexible, resilient head centered on a central axis and extending laterally therefrom. The head has an interior surface to face the interior environment, a concave exterior surface to face the exterior environment, and at least one self-sealing slit through the head. The head has confronting, openable portions along the at least one slit to define a normally closed orifice in an unconstrained condition wherein the openable portions can move in a first direction toward the exterior environment to an open orifice configuration and return in an opposite direction to a closed configuration. The valve further includes an annular, peripheral attachment portion centered on the central axis and spaced laterally from the head. The valve includes an annular, flexible, resilient, intermediate portion centered on the central axis and extending laterally from the head to the peripheral attachment portion. The intermediate portion has an interior surface to face the interior environment and an exterior surface to face the exterior environment. The interior surface of the head and the interior surface of the intermediate portion intersect at a first circular line of intersection. The exterior surface of the head and the exterior surface of the intermediate portion intersect at a second circular line of intersection. In the closed configuration of the valve, the first circular line of intersection and the second circular line of intersection are spaced a distance along the central axis no greater than about 0.30 millimeter. At least the head and the intermediate portion of the valve are formed from a thermoplastic elastomer. More preferably, in the closed configuration of the valve, the first circular line of intersection and the second circular line of intersection are spaced a distance along the central axis no greater than about 0.05 millimeter.

According to one preferred aspect of the present invention, in the closed configuration of the valve, the first circular line of intersection and the second circular line of intersection are located at substantially the same location along the central axis.

According to another aspect of the present invention, in the closed configuration of the valve, the first circular line of intersection is located axially inwardly (closer to the interior of a container) of the second circular line of intersection along the central axis.

According to yet another aspect of the present invention, in the closed configuration of the valve, the second circular line of intersection is located axially inwardly (closer to the interior of a container) of the first circular line of intersection along the central axis.

In one form of the present invention, the interior surface of the head defines a laterally outwardly facing peripheral region which flares laterally outwardly from the first circular line of intersection in a direction away from the exterior environment along the central axis.

In another form of the present invention, at least a portion of the head is substantially thicker than any part of the intermediate portion of the valve.

According to yet another form of the present invention, the head, peripheral attachment portion, and intermediate portion of the valve are unitarily molded from a thermoplastic elastomer.

In another form of the present invention, the valve openable portions are configured to move from the open orifice configuration into the closed configuration when the pressure differential between the interior environment and the exterior environment acting across the head is about 2,200 pascal.

According to one preferred aspect of the present invention, at least the head and the intermediate portion of the valve are formed from one of a TPE-s or a TPE-o material.

According to another aspect of the present invention, at least the head and the intermediate portion of the valve are formed from one of a TPE-u or a TPE-v material.

In one presently preferred form of the present invention, in the closed configuration of the valve, the first circular line of intersection has a first diameter, and the second circular line of intersection has a second diameter, and the ratio of the first diameter to the second diameter is about 1.09.

In another form of the present invention, the intermediate portion has a substantially J-shaped cross-section when viewed in a plane containing the central axis.

According to another form of the present invention, the valve is provided in combination with a closure and a retaining ring as a subassembly for use with a container of a fluent substance.

According to yet another form of the present invention, the valve is provided in combination with a closure and a container of a fluent substance, wherein the valve, the closure, and the container of a fluent substance define a package.

According to another broad aspect of the present invention, the invention includes a subassembly of a closure, a valve, and a retaining ring for maintaining the valve within the closure. The valve is a flexible, resilient slit valve for permitting selective dispensing of a fluent product from an interior environment to an exterior environment. The valve includes a flexible, resilient head centered on a central axis and extending laterally therefrom. The head has an interior surface to face the interior environment, a concave exterior surface to face the exterior environment, and at least one self-sealing slit through the head. The head has confronting, openable portions along the at least one slit to define a normally closed orifice in an unconstrained condition wherein the openable portions can move in a first direction toward the exterior environment to an open orifice configuration and return in an opposite direction to a closed configuration. The valve further includes an annular, peripheral attachment portion centered on the central axis and spaced laterally from the head and engaged by said retaining ring and said closure. The valve includes an annular, flexible, resilient, intermediate portion centered on the central axis and extending laterally from the head to the peripheral attachment portion. The intermediate portion having an interior surface to face the interior environment and an exterior surface to face the exterior environment. The interior surface of the head and the interior surface of the intermediate portion intersect at a first circular line of intersection. The exterior surface of the head and the exterior surface of the intermediate portion intersect at a second circular line of intersection. In the closed configuration of the valve, the first circular line of intersection and the second circular line of intersection are spaced a distance along the central axis no greater than about 0.30 millimeter. The valve is formed from a thermoplastic elastomer such that the subassembly of the closure, the valve, and the retaining are recyclable without disassembly. Preferably, the first circular line of intersection and the second circular line of intersection are spaced a distance along the central axis no greater than about 0.05 millimeter.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same, FIG. 1 shows the closure in an open condition and the valve in an unstressed, closed condition or configuration;

FIG. 3 is an enlarged, isometric view, taken from above, of only the valve of FIG. 1;

FIG. 4 is an enlarged, isometric view, taken from below, of the valve of FIG. 3;

FIG. 5 is an enlarged, top plan view of the valve of FIG. 3;

FIG. 6 is an enlarged, bottom plan view of the valve of FIG. 3;

FIG. 7 is an enlarged, side elevation view of the valve of FIG. 3;

FIG. 8 is an enlarged, cross-sectional view of the valve shown in FIG. 5, taken along plane 8-8;

FIG. 9 is an enlarged, cross-sectional view of the valve shown in FIG. 5, taken along plane 9-9;

FIG. 11 is similar to the view of the first embodiment of the valve illustrated in FIG. 10.

DESCRIPTION OF THE PREFERRED EMBODIMENTS

Figure 1:
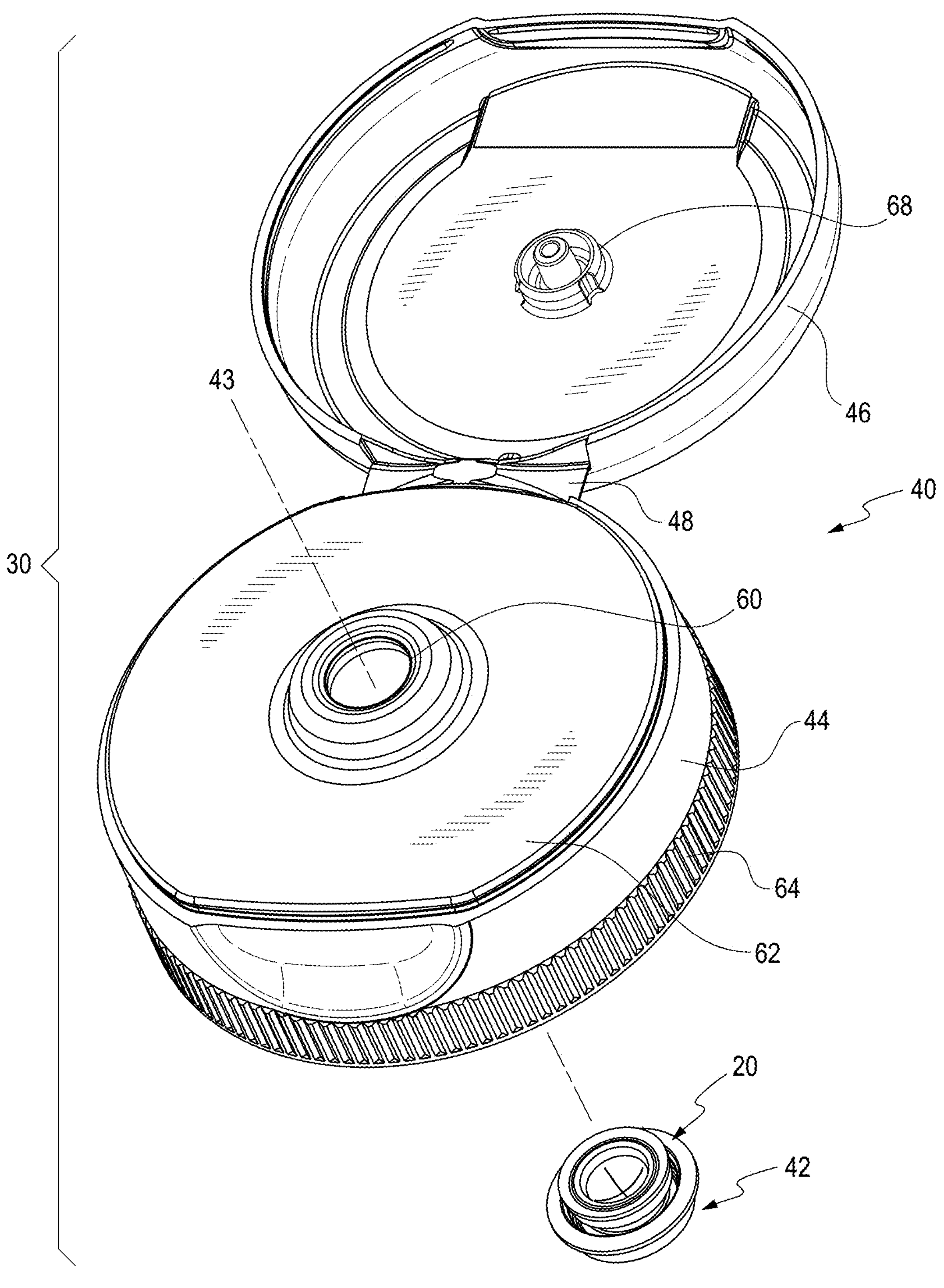
FIG. 1 is an enlarged, exploded, isometric view, taken from above, of a first embodiment of a valve according to the present invention prior to assembly with a closure and retaining ring.

While the valve of the present invention is susceptible of embodiment in many different forms, this specification and the accompanying drawings disclose only some specific forms as examples of the invention. The invention is not intended to be limited to only the embodiments so described, however.

For ease of description, the valve 20 of this invention is described, with reference to the drawings, in a generally horizontal orientation that the valve 20 could have when installed as sub-assembly or assembly 30 (FIG. 2) that includes a closure 40 (FIGS. 1 and 2 only), a valve 20, and a retainer or retaining ring 42, for use on a fluent substance container or system (not illustrated). The terms "axial", "radial", and "lateral" are used herein with respect to an axis 43 (FIGS. 1, 2, 8, and 9), generally defined by the center of the valve 20. As employed herein, the phrase "axially outwardly" refers to the direction upwardly in the figures, along the axis 43 with respect to the direction away from the interior of the container upon which the closure 40 and the valve 20 could be installed. The phrase "axially inwardly" refers to the direction downwardly in the figures, along the axis 43 with respect to the direction into the interior of the container upon which the closure 40 and the valve 20 could be installed. As employed herein, the phrase "radially inwardly" refers to a direction normal to, and moving toward, the axis 43. The phrase "radially outwardly" refers to a direction normal to, and moving away from, the axis 43. The phrase "laterally outwardly" refers to a direction away from the axis 43 and also within a plane that is normal to the axis 43. It will be understood, however, that this invention may be manufactured, stored, transported, used, or sold in orientations other than the orientation shown.

The valve 20 of this invention is suitable for use with a variety of conventional or special fluent substance containers or systems (e.g., fluent substance handling or processing systems, dispensing systems, etc.) having various designs, the details of which, although not illustrated or described, would be apparent to those having skill in the art and an understanding of such systems.

FIGS. 1-10 illustrate a preferred, first embodiment of a valve 20 according to the present invention. The valve 20 is used for selectively permitting communication through the valve 20 from one side of the valve to the other side (e.g., into or out of a fluent substance container or dispensing system, conduit, or package), and the valve 20 typically would be in communication with an interior of such a container or system. The valve 20 is especially adapted to be installed in a closure 40 (FIGS. 1 and 2 only) to be attached or assembled at the opening of a fluent substance dispensing system. The fluent substance container may be, for example, a flexible bag or a bottle. The valve 20 could also be installed on a reservoir, a fluent substance dispensing system, which contains a fluent substance at ambient atmospheric pressure or above ambient atmospheric pressure (including a system in which the pressure results from the static head of the fluent substance within the system and/or in which the system generates or otherwise creates a pressurized fluent substance therein).

Figure 2:
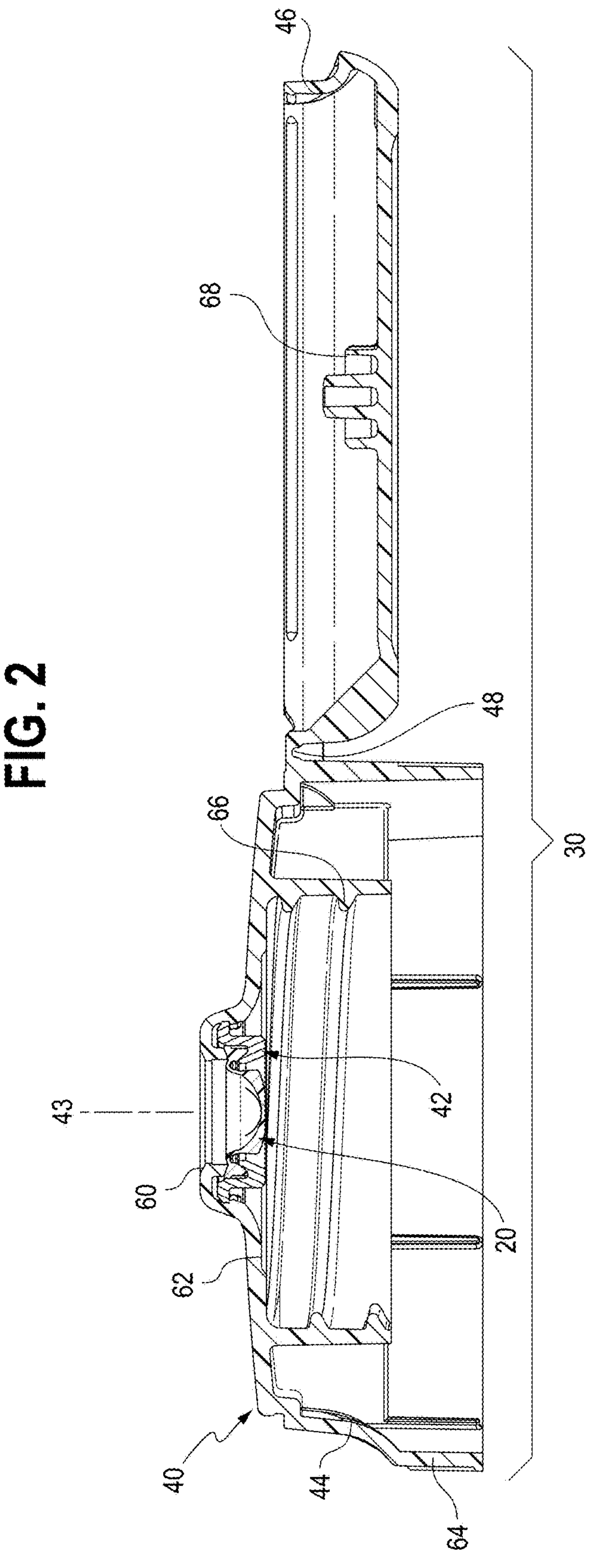
FIG. 2 is an enlarged, cross-sectional view of the assembled valve, closure, and retaining ring of FIG. 1, taken along a vertical plane containing the central axis of the valve and extending through the center of the hinge of the closure.

The closure 40 illustrated in FIGS. 1 and 2 includes a generally cylindrical base or body 44 and a lid 46 that is connected to the body 44 by a hinge 48. The body 44 defines a dispensing orifice 60 which is occluded or covered by the lid 46 in a closed position (not illustrated) rotated away from the as-molded, open position as shown in the figures. A top deck 62 of the body 44, which surrounds the dispensing orifice 60, connects to an outer wall or skirt 64 which is for surrounding a top end of the container when the assembly 30 is installed at the opening of the container. The body 44 further includes an attachment means in the form of screw threads 66 for mating with threads of a container (not illustrated). It will be understood that the body 44 may have other removable or non-removable attachment means or features for securing the body 44 at the opening or neck of a container, such as mating snap-fit beads, deformable and non-removable bands or flanges, toggle clamps, friction fittings, locks, adhesives, welding, etc.

With reference now to FIG. 1, the hinge 48 may be of any suitable conventional or special design. For example, the hinge 48 illustrated in the figures may be of a conventional snap-action type such as described in the U.S. Pat. No. 5,356,017 or U.S. Pat. No. 5,642,824, the details of which form no part of the present invention. The hinge 48 could also be a non-snap-action type, such as a strap or tether. The lid 46 includes a hollow plug seal 68 that extends axially inwardly therefrom to seal the dispensing orifice 60 when the lid 46 is in its closed position. The body 44, in the region surrounding the dispensing orifice 60, and/or the lid plug seal 68, are sufficiently flexible to accommodate elastic deformation to establish a leak-tight seal therebetween. The lid 46 may have other latching means such as snap fit beads, locks, tabs, etc. The lid 46 may mated with the body 44 in a wholly removable manner, such as mating screw threads, friction, or snap fit beads, etc. The lid 46 may be omitted altogether in some non-preferred applications.

The first illustrated embodiment of the valve 20 is flexible, resilient, pressure-openable, self-closing, and of the slit-type. Forms of generally related kinds of slit-type valves are disclosed in the U.S. Pat. Nos. 8,678,249 and 5,839,614. The descriptions of those patents are incorporated herein by reference thereto to the extent pertinent and to the extent not inconsistent herewith.

The valve 20 of the present invention is suitable for use with fluent substances, such as liquids and gases, including, inter alia, beverages, food products, lotions, and creams. The valve 20 is preferably molded as a unitary structure (i.e., one-piece structure) from a thermoplastic elastomer (TPE) material which is flexible, pliable, elastic, and resilient. This can include styrenic block copolymers (TPE-s), thermoplastic polyolefin elastomers (TPE-o), thermoplastic polyurethanes (TPE-u), or thermoplastic vulcanizates (TPE-v).

Preferably, the valve 20 is unitarily formed from a TPE-s or TPE-o material. It is desirable in many applications that the valve material be substantially inert so as to avoid reaction with, and/or adulteration of, the fluent substance that comes into contact with the valve 20.

While the valve 20 is illustrated as being formed from a material as a single substance that defines a unitary layer of material substance, it will be appreciated that for some applications the valve 20 may be formed from a material that is defined by two or more layers of different substances. For example, one layer of the valve material may be formed form a first TPE material, and one or more other layers of the valve material may be formed from coatings or laminations of one or more different substances.

The valve 20 has an initially "closed", unactuated, substantially unstressed, rest position or condition as illustrated in the figures. The valve 20 can be forced to an "open" position or condition when a sufficiently high pressure differential acts across the opposite sides of the valve 20, or when the valve 20 is engaged by a sufficiently rigid article coming into contact with the valve 20 material.

With reference to FIGS. 8 and 9, the valve 20 material has a first side 114 and a second side 116. In preferred applications, the first side 114 will face an interior of a fluent substance container and the second side 116 will face an exterior, ambient environment. In other applications, the valve 20 may be contained wholly within a conduit or system for processing, dispensing, or handling a fluent substance.

Figure 10:
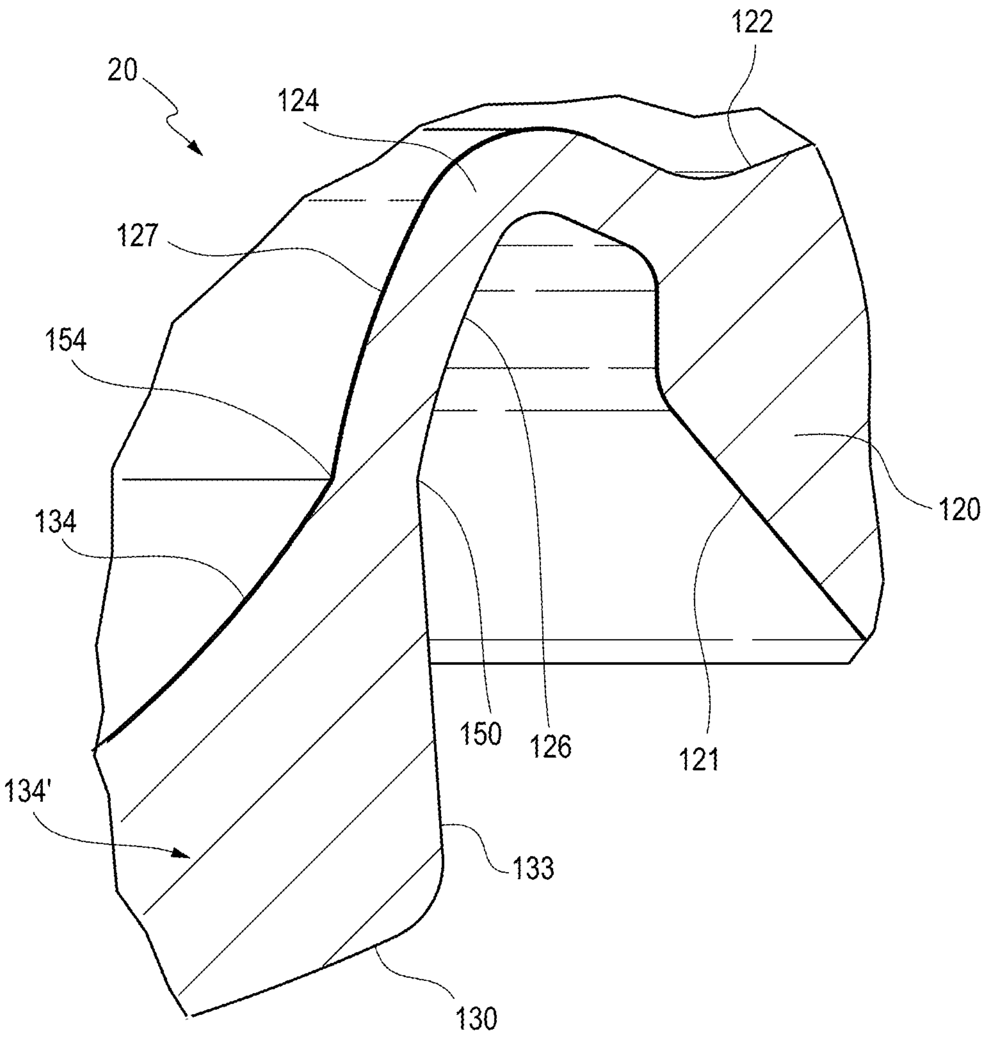
FIG. 10 is a greatly enlarged, fragmentary, cross-sectional view of the portion of the valve of FIG. 9 that is enclosed in the circle designated as "FIG. 10"

Still referring to FIGS. 8 and 10, the valve 20 has a mounting flange or peripheral attachment portion 120. The peripheral attachment portion 120 may have any suitable configuration for being mounted to, attached to, connected with, or for otherwise accommodating, installation on or in a closure or a container. Typically, this may be achieved through a retention structure or retaining ring 42 (FIGS. 1 and 2 only) that can mate with a feature inside of the closure 40 (as shown in FIG. 2) or mate with a feature of a container (not illustrated) in which the valve 20 may be installed.

The particular configuration of the peripheral attachment portion 120 illustrated in FIGS. 8 and 9 may be characterized generally as a modified dove-tail configuration when viewed in a vertical cross-sectional plane containing the central axis 43. The peripheral attachment portion 120 includes a first frustoconical surface 121 and a second frustoconical surface 122 for being clamped between the retaining ring 42 (FIG. 1) and the closure 40 (FIG. 1) for retaining or holding the valve 20 in place. Preferably, the peripheral attachment portion 120 is somewhat resiliently compressed so as to accommodate the creation of a secure, leak-resistant seal when the peripheral attachment portion 120 is compressively engaged within the closure 40 or a container.

With appropriate modification of the closure 40 or container, other shapes could be used for the peripheral attachment portion 120. Some other shapes of flange cross sections which could be employed on the valve 20 are illustrated in the U.S. Pat. No. 5,409,144. In some applications, it may be desirable to configure the peripheral attachment portion 120 for attachment to the closure 40 or container by means of adhesive, heat bonding, or other suitable means, bi-injection molding, such that the retaining ring 42 may be omitted altogether.

As shown in FIGS. 8 and 9, extending generally radially inwardly toward the central axis 43, and away from the peripheral attachment portion 120, the valve 20 includes a generally annular, intermediate portion or sleeve 124 that connects laterally between the peripheral attachment portion 120 to a central head portion or head 125. The head portion 125 is flexible and resilient. When the valve 20 is in the closed position, condition, or configuration as shown in FIGS. 1-10, the intermediate portion 124 has a tubular configuration to locate the head portion 125 so that a part of the head portion 125 projects axially inwardly (e.g., toward the interior of the container or system) beyond the peripheral attachment portion 120.

The intermediate portion 124 of the valve 20 is preferably configured for use in conjunction with a particular fluent substance supply system or container, and a specific type of fluent substance, so as to achieve the flow characteristics desired. For example, the viscosity and density of the fluent substance are factors to be considered. The rigidity and durometer of the valve material, and size and thickness of portions of both the head portion 125 and the intermediate portion 124, are additional factors to be considered.

As can be seen in FIG. 6, the head portion 125 of the valve 20 has a generally circular configuration in plan view. The peripheral attachment portion 120, the intermediate portion 124, and the head portion 125 are oriented in a generally circular configuration and concentric relationship relative to the central axis 43 (visible in FIG. 9). A fluid substance can be dispensed (i.e., discharged) through the valve 20 in a discharge flow direction axially outwardly generally along the axis 43 when the valve 20 opens, as will be discussed in detail hereinafter. An engagement article, such as the probe, can also be used to engage and open the valve 20 and to facilitate communication of a fluid substance through the valve 20.

Referring now to FIG. 8, the intermediate portion 124 has a generally J-shaped or inverted J-shaped cross-section when the valve 20 is in the closed condition and viewed along a vertical cross sectional plane containing the axis 43 and defines an interior surface 126 for facing the interior of a container and defines an exterior surface 127 for facing the exterior environment when the valve 20 is installed across the dispensing orifice 60 (FIG. 2).

Still referring to FIG. 8, the valve head 125 has an interior surface 130 with a generally convex configuration when the valve 20 is in the closed condition and viewed along a vertical cross sectional plane containing the axis 43. The interior surface 130 of the head portion 125 has a planar and circular central region 132 extending laterally outwardly around the axis 43 when the valve 20 is in the closed condition. The interior surface 130 of the valve head 125 further defines or includes a laterally outwardly facing peripheral region 133 that flares laterally outwardly from the connection with the intermediate portion 124 in the axially inwardly direction toward the container interior. The interior surface 130 of the head portion 125 lies on a partially spherical locus that also defines a circular arc in longitudinal cross section as viewed along a plane containing the axis 43.

An exterior surface 134 of the valve head 125 has a partially spherical and concave configuration, when the valve 20 is in the closed condition and viewed in FIG. 8 along a vertical cross-sectional plane containing the axis 43. The radius of the circular arc of the head portion 125 on the exterior surface 134 is smaller (less) than the radius of the circular arc of the head portion 125 on the interior surface 130.

Referring to FIGS. 8 and 9, when the head portion 125 is viewed in cross section, most of the head portion 125 is substantially thicker than the relatively thin intermediate portion 124 of the valve 20. In addition, the head portion 125 is thicker at a radially outer portion thereof and is thinner at a radially inside portion thereof near the axis 43. This configuration assists in providing a desirable opening action and closing action of the valve 20.

While the first illustrated embodiment of the valve 20 has a distinct head portion 125, an intermediate portion 124, and a peripheral attachment portion 120, it will be understood that in one broad aspect of the present invention the valve 20 need not be limited to such a structure. For example, in one contemplated application of the valve 20, the peripheral attachment portion 120, if provided, could be a rigid member (e.g., a thermoplastic ring or retainer) attached to the rest of the valve 20. Alternatively, the valve 20 may be molded with the closure 40 or container such that the closure 40 or container forms the peripheral attachment portion, per se.

With reference to FIG. 5, the head portion 125 of the valve 20 has a pair self-sealing, intersecting slits 140 that each extend transversely and fully through the head portion 125. The slits 140 radiate generally from the center of the head portion 125. The slits 140 define openable flaps, segments, portions or petals 144 in the valve head portion 125 to define a normally closed orifice. Each petal has two transverse faces defined by the slits 140, and each transverse face seals against a confronting transverse face of an adjacent petal when the valve orifice is closed. Variations and forms of such openable portions are disclosed in U.S. Pat. No. 8,628,056. The description of that patent is incorporated herein by reference thereto to the extent pertinent and to the extent not inconsistent herewith.

As best shown in FIG. 10, in the normally closed position or configuration of the valve 20, the interior surface 130 of the head 125 (which includes the laterally outwardly facing peripheral region 133) and the interior surface 126 of the intermediate portion join or intersect at a first circular line of intersection 150 (also visible in FIG. 4). In addition, the exterior surface 134 of the head 125 and the exterior surface 127 of the intermediate portion 124 join or intersect at a second circular line of intersection 154 (also visible in FIG. 3). In the preferred, illustrated first embodiment of the valve 20 shown in FIG. 10, the first circular line of intersection 150 and the second circular line of intersection 154 are located substantially at the same axial location along the central axis 43 (FIG. 8). Preferably, the first circular line of intersection 150 and the second circular line of intersection 154 are spaced a distance along the central axis no greater than about 0.30 millimeter (0.011 inch). More preferably, the first circular line of intersection 150 and the second circular line of intersection 154 are spaced a distance along the central axis no greater than about 0.05 millimeter (0.002 inch).

With reference to FIG. 8, in the closed configuration of the valve 20, the first circular line of intersection 150 defines a first diameter and the second circular line of intersection 154 defines a second diameter, and the ratio of the first diameter to the second diameter is about 1.09.

The inventors have found that the TPE valve 20 disclosed herein with the first circular line of intersection 150 and the second circular line of intersection 154 located substantially at the same axial location may address many of the dispensing performance issues experienced by conventional TPE valves. For example, the valve 20 of the present invention has been found to significantly improve (i.e., increase) the closing force of the valve 20 against pressure by 10-25% compared to a conventional valve made of TPE. Specifically, the valve 20 has been found to close or re-close against an internal pressure differential against the interior surface of the valve of about 10.4 in$H_2O$ (2590 pascal) while a convention valve made of TPE has been found to close off against an internal pressure differential against the interior surface of the valve of about 8.0 in$H_2O$ (1990 pascal). Preferably, the openable portions of the valve 20 will close (i.e., move from the open orifice configuration into the closed configuration) even when subjected to an internal pressure differential between the interior environment and the exterior environment acting against the interior surface 130 of the valve head 125 of about 2,200 pascal (i.e., +400/−100 pascal).

The inventors have found that the first circular line of intersection 150 and the second circular line of intersection 154 should be spaced a distance along the central axis in either direction no greater than about 0.30 millimeter (0.011 inch) to result in a functional TPE valve for many applications. Furthermore, the inventors have found that the first circular line of intersection 150 and the second circular line of intersection 154 should be spaced a distance along the central axis in either direction no greater than about 0.05 millimeter (0.002 inch) to achieve at least a 10% improvement or increase in valve closing force against pressure compared to a conventional TPE valve. Specifically, a variant of the TPE valve 20 with the intersection 154 being located axially outward of the intersection 150 at a distance no greater than about 0.05 millimeter has been found to close off against an internal pressure of about 9.0 in$H_2O$ (2242 pascal). Furthermore, a variant of the TPE valve 20 with the intersection 150 being located axially outward of the intersection 154 at a distance no greater than about 0.05 millimeter has been found to close off against an internal pressure of about 8.9 in$H_2O$ (2217 pascal). The present invention contemplates that the spacing of the intersections 150 and 154 may be in either direction along the central axis 43, wherein the intersection 150 is located axially outward of the intersection 154, or wherein the intersection 154 is located axially outward of the intersection 150.

In the preferred embodiment of the valve 20, the valve 20 is injection molded from a TPE material, and the slits 140 are subsequently cut or stamped into the head portion 125 by suitable special or conventional techniques. Alternatively, the valve 20 can be molded to define the slits 140. It will be appreciated that in some applications the valve 20 may be provided with one slit 140 or more than two slits 140 arranged in a different configuration than that illustrated.

The inventors have found the valve 20 of the present invention, may improve the transportability and/or storage characteristics of a container or other system in which the valve 20 is installed compared to conventional TPE valves. In particular, the improved valve 20 may eliminate, or at least reduce or minimize, undesirable, premature valve opening events or other ingress or egress leakage events during transportation, storage, heating, or over-pressurization of the fluent substance container or system in which the valve 20 is installed.

It may be desirable to modify the valve 20 to remain closed at even greater pressure differentials in some applications, such as when (i) the valve is installed in a package in a different orientation than the one that is illustrated, (ii) the package in which the valve is installed is subjected to a longer or a higher temperature pasteurization process, or (iii) the package in which the valve is installed is likely to experience greater shocks and impacts during shipping, etc.

Figure 11:
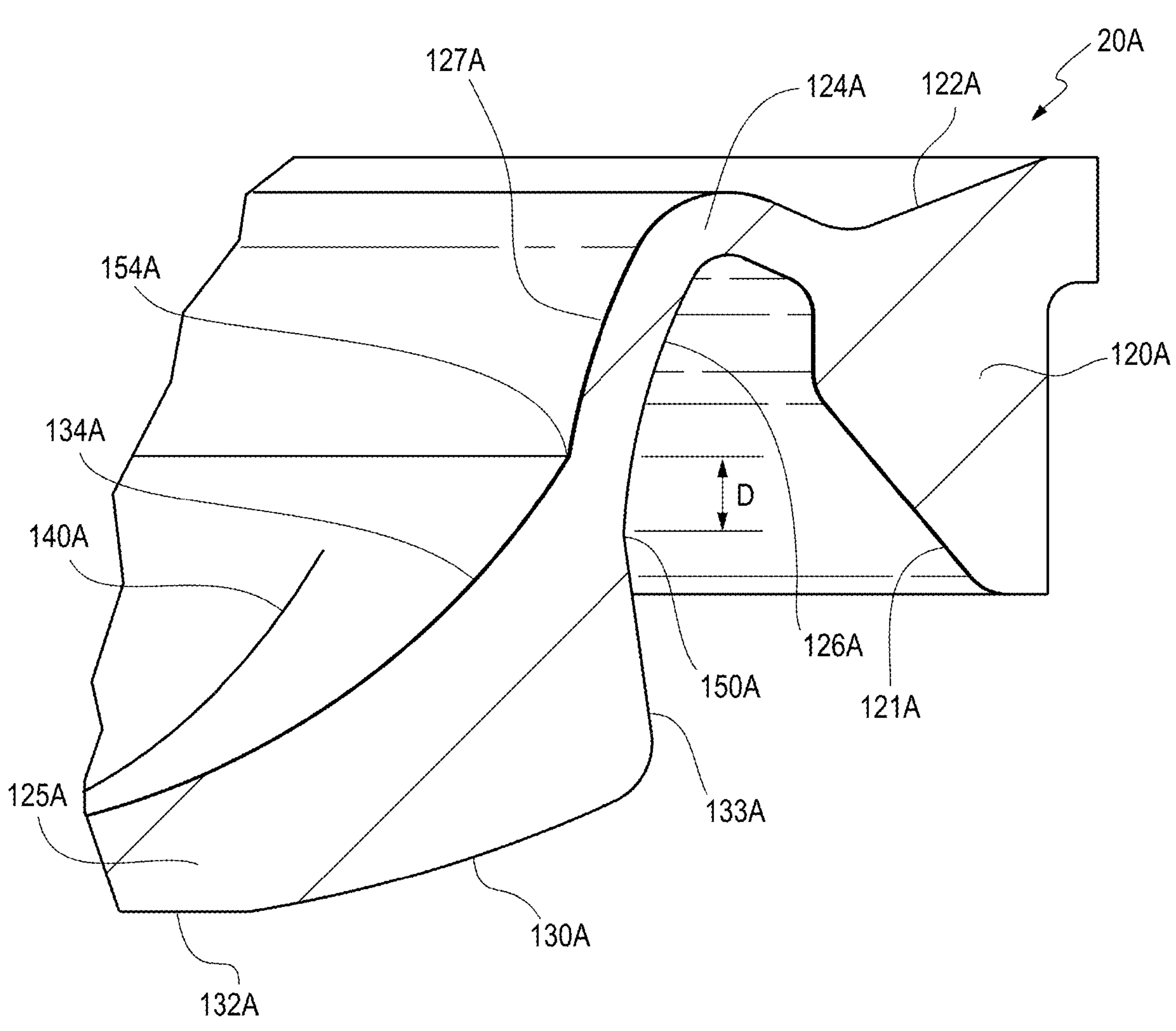
FIG. 11 is a greatly enlarged, fragmentary, cross-sectional view of a portion of a second embodiment of a valve according to the present invention.

A second embodiment of a valve 20A according to the present invention is illustrated in FIG. 11. The second illustrated embodiment of the valve 20A can be formed from the same TPE material, or TPE materials, which are discussed in detail above with respect to the first illustrated embodiment of the valve 20. Like elements between the first illustrated embodiment of the valve 20 and the second illustrated embodiment of the valve 20A are designated with the same numeral (the first embodiment having no suffix and the second embodiment having an "A" suffix).

The second illustrated embodiment of the valve 20A has the same basic elements, and functions in the same basic manner, as the first illustrated embodiment of the valve 20. The valve 20A includes a peripheral attachment portion 120A for being affixed at the opening of a closure or container, and an intermediate portion 124A connecting the peripheral portion 120A to a central valve head 125A, and these components or portions of the valve 20A have the same basic shape as discussed above with respect to the first illustrated embodiment of the valve 20. The valve head 125A includes a pair of intersecting slits 140A arranged in the same orthogonal manner as discussed above with respect to the first illustrated embodiment of the valve 20.

However, the second illustrated embodiment of the valve 20A shown in FIG. 11 differs from the prior-discussed first illustrated embodiment of the valve 20 in that the valve 20A has a modified arrangement of the interior and exterior connections between the intermediate portion 124A and the head 125A. Specifically, the first circular line of intersection 150A on the interior side of the valve 20A and the second circular line of intersection 154A on the exterior side of the valve 20A are spaced a distance "D" along the central axis no greater than about 0.05 millimeter (0.002 inch), with the first circular line of intersection 150A on the interior side of the valve 20A being located axially inwardly of (i.e., toward the interior of the container or dispensing system) the second circular line of intersection 154A.

While not illustrated, the present invention encompasses a modified valve design wherein the first circular line of intersection 150A on the interior side of the valve 20A and the second circular line of intersection 154A on the exterior side of the valve 20A are spaced a distance "D" along the central axis no greater than about 0.05 millimeter (0.002 inch), with the second circular line of intersection 154A on the exterior side of the valve 20A being located axially inwardly of (i.e., toward the interior of the container or dispensing system) the first circular line of intersection 150A.

In one broad aspect of the invention, the invention may be limited to only the valves disclosed herein. In another broad aspect of the present invention, the invention may include a fully recyclable sub-assembly of the valve, retaining ring, and closure disclosed herein. In still another broad aspect of the present invention, the invention may include a fully recyclable package including the valve and closure disclosed herein (with or without a retaining ring) and a container of a fluent substance. The container may have any conventional or special design.

It will be appreciated that while various theories and explanations have been set forth herein with respect to how the component configurations and arrangements may affect the operation of the inventive valves, there is no intention to be bound by such theories and explanations. Further it is intended that all structures falling within the scope of the appended claims are not to be otherwise excluded from the scope of the claims merely because the operation of such valves may not be accounted for by the explanations and theories presented herein.

Various modifications and alterations to this invention will become apparent to those skilled in the art without departing from the scope and spirit of this invention. Illustrative embodiments and examples are provided as examples only and are not intended to limit the scope of the present invention.

What is claimed is:

1. A flexible, resilient slit valve for permitting selective dispensing of a fluent product from an interior environment to an exterior environment, said valve comprising:

a flexible, resilient head centered on a central axis and extending laterally therefrom, said head having an interior surface to face the interior environment, a concave exterior surface to face the exterior environment, and at least one self-sealing slit through said head;

confronting, openable portions along the at least one slit to define a normally closed orifice in an unconstrained condition wherein the openable portions can move in a first direction toward the exterior environment to an open orifice configuration and return in an opposite direction to a closed configuration;

an annular, peripheral attachment portion centered on said central axis and spaced laterally from said head;

an annular, flexible, resilient, intermediate portion centered on said central axis and extending laterally from said head to said peripheral attachment portion, said intermediate portion having an interior surface to face said interior environment and an exterior surface to face said exterior environment; and wherein said interior surface of said head and said interior surface of said intermediate portion intersect at a first circular line of intersection, said exterior surface of said head and said exterior surface of said intermediate portion intersect at a second circular line of intersection, in said closed configuration said first circular line of intersection and said second circular line of intersection are spaced a distance along said central axis no greater than about 0.30 millimeter; and at least said head and said intermediate portion are formed from a thermoplastic elastomer.

2. The valve according to claim 1 wherein in said closed configuration said first circular line of intersection and said second circular line of intersection are spaced a distance along said central axis no greater than about 0.05 millimeter.

3. The valve according to claim 1 wherein in said closed configuration said first circular line of intersection and said second circular line of intersection are located at substantially the same location along said central axis.

4. The valve according to claim 1 wherein in said closed configuration said first circular line of intersection is located axially inwardly of said second circular line of intersection along said central axis.

5. The valve according to claim 1 wherein in said closed configuration said second circular line of intersection is located axially inwardly said first circular line of intersection along said central axis.

6. The valve according to claim 1 wherein said head interior surface defines a laterally outwardly facing peripheral region which flares laterally outwardly from said first circular line of intersection in a direction away from said exterior environment along said central axis.

7. The valve according to claim 1 wherein at least a portion of said head is substantially thicker than said intermediate portion.

8. The valve according to claim 1 wherein said head, said peripheral attachment portion, and said intermediate portion are unitarily molded from a thermoplastic elastomer.

9. The valve according to claim 1 wherein said openable portions are configured to move from said open orifice configuration into said closed configuration when the pressure differential between the interior environment and the exterior environment acting across said head is about 2,200 pascal.

10. The valve according to claim 1 wherein at least said head and said intermediate portion are formed from one of TPE-s or TPE-o.

11. The valve according to claim 1 wherein at least said head and said intermediate portion are formed from one of TPE-u or TPE-v.

12. The valve according to claim 1 wherein in said closed configuration said first circular line of intersection has a first diameter and said second circular line of intersection has a second diameter, and the ratio of said first diameter to said second diameter is about 1.09.

13. The valve according to claim 1 wherein said intermediate portion has a substantially J-shaped cross-section when viewed in a plane containing said central axis.

14. The valve according to claim 1 in combination with a closure and a retaining ring for use with a container of a fluent substance.

15. The valve according to claim 1 in combination with a closure and a container of a fluent substance, said valve, closure, and container of fluent substance defining a package.

16. A subassembly comprising:

a closure;

a valve; and a retaining ring for maintaining said valve within said closure;

wherein said valve includes i) a flexible, resilient head centered on a central axis and extending laterally therefrom, said head having an interior surface to face the interior environment, a concave exterior surface to face the exterior environment, and at least one self-sealing slit through said head, ii) confronting, openable portions along the at least one slit to define a normally closed orifice in an unconstrained condition wherein the openable portions can move in a first direction toward the exterior environment to an open orifice configuration and return in an opposite direction to a closed configuration, iii) an annular, peripheral attachment portion centered on said central axis and spaced laterally from said head, and iv) an annular, flexible, resilient, intermediate portion centered on said central axis and extending laterally from said head to said peripheral attachment portion, said intermediate portion having an interior surface to face said interior environment and an exterior surface to face said exterior environment, wherein said interior surface of said head and said interior surface of said intermediate portion intersect at a first circular line of intersection, said exterior surface of said head and said exterior surface of said intermediate portion intersect at a second circular line of intersection, in said closed configuration said first circular line of intersection and said second circular line of intersection are spaced a distance along said central axis no greater than about 0.30 millimeter, and said valve is formed from a thermoplastic elastomer such that said subassembly is recyclable without disassembly.

* * * * *